Figure 1:
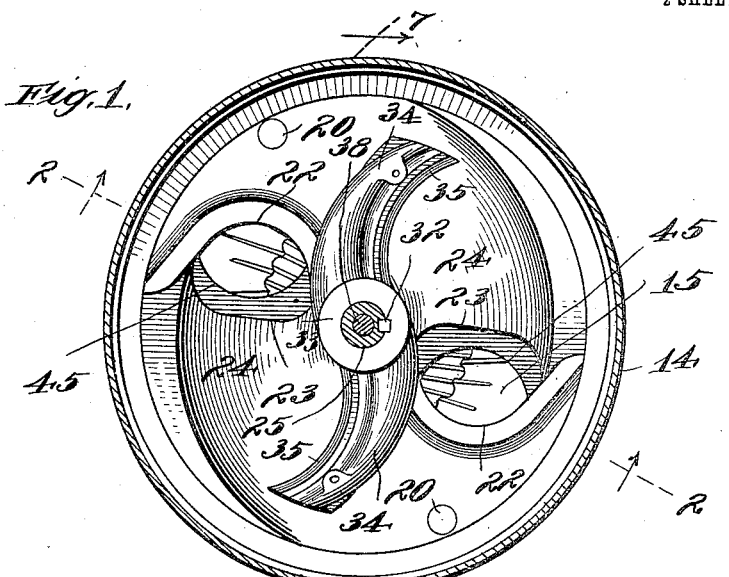

H. G. McCULLOCH.
GRINDER.
APPLICATION FILED OCT. 11, 1907.

909,316.

Patented Jan. 12, 1909.

2 SHEETS—SHEET 1.

Witnesses:

Inventor:
Harry G. McCulloch
By Offield, Towle & Linthicum
Attys

H. G. McCULLOCH.
GRINDER.
APPLICATION FILED OCT. 11, 1907.
909,316.
Patented Jan. 12, 1909.
2 SHEETS—SHEET 2.
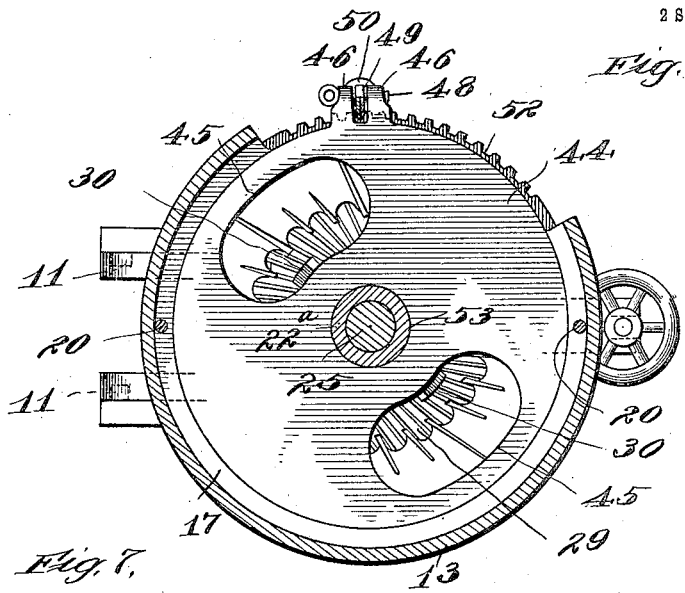
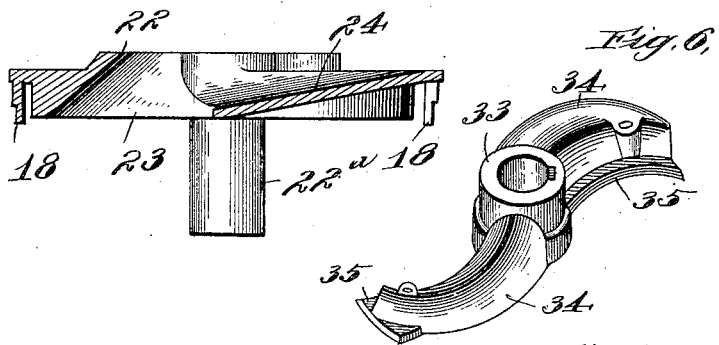
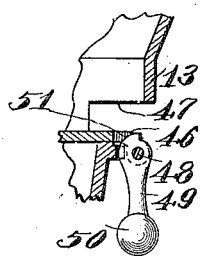
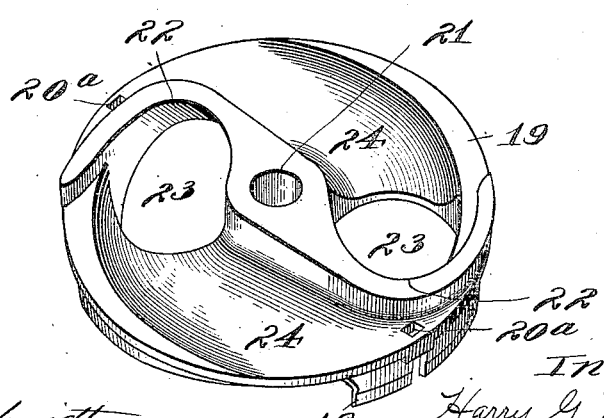
Witnesses.
G. A. Raubenschmidt
Walter M. Fuller
Inventor.
Harry G. McCulloch
By Offield Towle & Linthicum
Attys

UNITED STATES PATENT OFFICE.

HARRY GEORGE McCULLOCH, OF FREEPORT, ILLINOIS, ASSIGNOR TO THE STOVER MANUFACTURING COMPANY, OF FREEPORT, ILLINOIS, A CORPORATION OF ILLINOIS.

GRINDER.

No. 909,316.          Specification of Letters Patent.          Patented Jan. 12, 1909.

Application filed October 11, 1907. Serial No. 396,932.

*To all whom it may concern:*

Be it known that I, HARRY GEORGE McCULLOCH, a citizen of the United States, residing at Freeport, in the county of Stephenson and State of Illinois, have invented certain new and useful Improvements in Grinders, of which the following is a specification.

My invention relates to grinders in general, but more especially to mills adapted to grind Kafir corn and ear corn with the husks on.

One feature of my invention is the provision of an adjustable valve between upper cutting knives and lower grinding burs, whereby the feeding of the cut ears to the burs may be readily controlled and regulated.

Another salient characteristic of my invention is the provision of inclined surfaces on the top of the stationary cutter member leading to apertures therethrough located just in front of its cutting edges so as to direct the ears of corn to a position where they may be caught between the sharp edges of the stationary and rotary cutters and afterwards drop through the holes to the burs.

On the accompanying drawings I have illustrated the preferred and most desirable embodiment of my invention, and on the various views of the drawings like reference characters refer to the same parts throughout.

Figure 2:
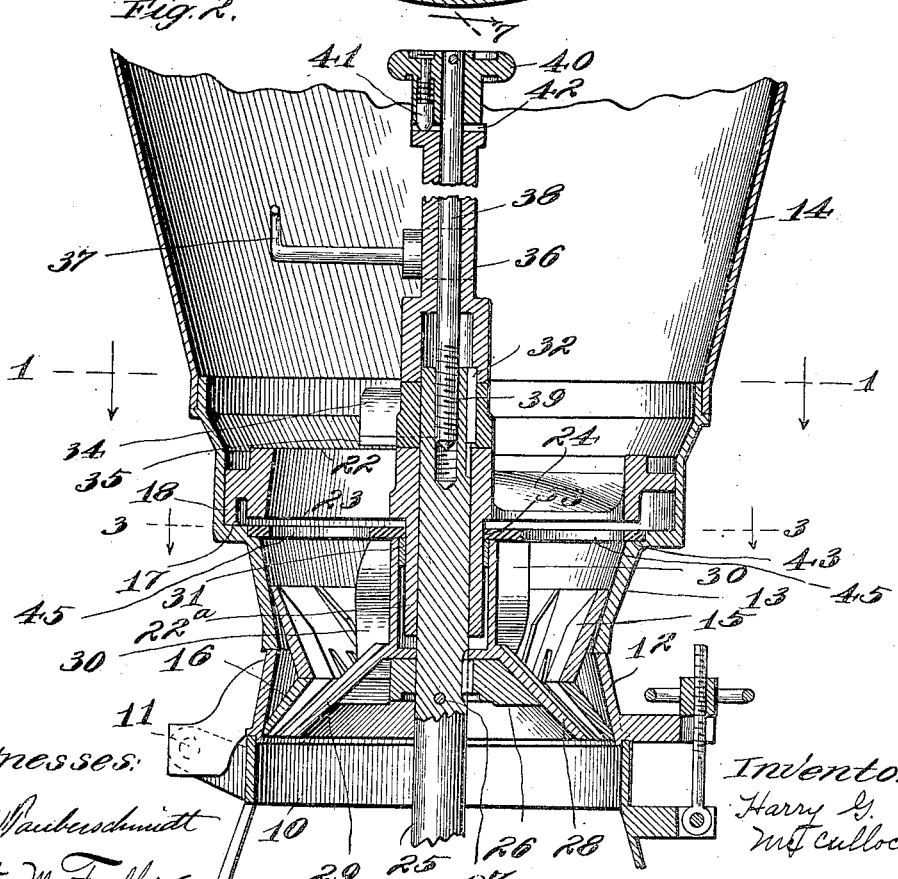

On said drawings—Figure 1 is a horizontal section through my improved grinder on line 1—1 of Fig. 2; Fig. 2 is a vertical central section of the grinder on line 2—2 of Fig. 1; Fig 3 is a horizontal section on line 3—3 of Fig. 2, Fig. 4 is a fragmentary section illustrating the locking handle for holding the valve plate in adjusted position; Fig. 5 is a perspective view of the stationary cutter member; Fig. 6 is a similar view of the rotary cutter member; and Fig. 7 is a vertical section through the stationary cutter on the curved line 7—7 of Fig. 1.

Hinged on a suitable base or support 10 at 11 is a main inclosing housing or casing composed of two parts 12 and 13 securely bolted together, the top portion 13 bearing at its upper end a hopper 14 of substantial size and capacity. Mounted within the lower portion of this casing is a stationary bur composed of two parts 15 and 16, the former flaring or diverging upwardly, while the latter flares downwardly, as is clearly indicated in Fig. 2. The part 13 of the casing is supplied with a circular seat 17 on which rests the lower edges of curved flanges 18 extended downwardly from the bottom surface of a round stationary cutter member 19 which is maintained in place on the seat 17 by means of suitable bolts 20 passed through apertures $20^a$ in the member 19 and similar apertures in the seat 17. This member 19 is centrally apertured at 21 for the accommodation of a shaft hereinafter described, and has centrally disposed and extended downwardly from its bottom surface an apertured hub $22^a$, which also accommodates the shaft mentioned. On its top face the stationary cutter 19 is supplied with a pair of upstanding curved cutting edges 22 in front of which and extended through the member are the two apertures 23. The top surface of this member 19 also has the two portions 24 which are inclined downwardly leading to the apertures 23, as is clearly indicated in Figs. 5 and 7.

A main vertical driving shaft 25, rotated by any suitable source of power (not illustrated), is centrally located within the grinder, and has keyed to itself a supporting cross-bar 26, prevented from downward movement by a transverse pin 27, and on which rests the rotary bur 28 having a conical lower portion 29 and an upper part 30 of substantially uniform dimensions, the hub $22^a$ of the stationary cutter 19 extending downwardly within the part 30 of the bur and forming a bearing at 31 on which it may turn. Above the stationary cutter member 19 and fastened to the driving shaft 25 by a key 32 there is provided a rotary cutter, illustrated in Fig. 6, having a central apertured hub 33 and a pair of opposite outwardly-extended curved arms 34 with cutting edges at 35, this rotary cutter being located just above the stationary cutter member 19 so that their sharp cutting edges 22 and 35 may coöperate to cut the ears of corn into parts. A sleeve 36 is mounted on shaft 25 above the rotary cutter and is splined thereto by the key 32, whereby the rotation of the shaft causes a like rotation of the sleeve, which is equipped with a single radially-extended hook-shaped agitator 37 adapted to stir up or agitate the ears of corn to provide proper feeding of the same to the cutters. Extended through the hollow interior of the sleeve 36 there is a shaft or rod 38 having at its lower end a screw-threaded connection at 39 with the top end of the driving shaft 25. An adjusting handle 40 is pinned to the top end of this rod 38 and is supplied with a downwardly-acting spring-pressed catch 41 adapted to engage in any one of a plurality of notches 42 on the upper end of sleeve 36. By manually turning the handle 40, the shaft 25 and the rotary bur secured thereto may be raised or lowered to bring the rotary and stationary burs closer together or to permit the movable bur to recede from the stationary one to adjust the fineness of the grinding. As is obvious, this adjustment may occur at any time, even though the shaft and sleeve are rotating.

Rotatable in a circular seat 43 on the inner side of casing 13 I provide a round valve plate 44 apertured at 45, the number of apertures corresponding to the number of holes 23 of the stationary cutter member 19, having a pair of spaced ears 46 extended through an arcuate or curved slot 47 in the side of casing 13, and having pivoted between them on a pin 48 supported by the ears, a locking handle 49 weighted at its lower end at 50, and supplied with a portion 51 adapted to engage in any one of a plurality of notches 52 on the outer face of the casing 13. This valve plate has a central hole 53 through which extends the hub 22ª of member 19. It should be noticed that this valve plate is located between the cutters and the burs and just below the apertures 23 of plate 19, and that the holes 45 by the rotation of the valve plate may be brought into and out of register with the holes 23, the plate opening or closing the latter, as occasion demands, to control the feed of the cut corn to the burs.

The operation of this device is substantially as follows: The vertical shaft 25 is rotated by any suitable source of power, and because of the splined connections therewith the inner bur, the upper cutter, the sleeve 36, agitator 37, and handle 40 all rotate. The ears of corn are brought between the sharp cutting edges of the stationary and rotary cutters and are directed to such positions that they will be acted upon by these cutters by the inclined surfaces 24 leading to apertures 23. The cut portions of the ears, as soon as they have been severed by the knife edges, drop through the openings 23 and 45 to the burs, between which they are caught and by which they are ground, the finished product leaving the lower portion of the grinder, as is obvious. The rapidity of feed to the burs may be readily controlled by adjusting the position of plate 44, the operator first lifting the handle 49 so as to free the portion 51 thereof from the notches 52. It will be readily understood that the movement or partial rotation of the valve plate 44 opens or closes the apertures 23 to a greater or less extent, and that upon releasing the handle 49 it, by its own weight, drops to a vertical position, shown in Fig. 4, the portion 51 thereof fitting in one of the notches 52, thereby locking the valve plate in adjusted position.

To those skilled in the art it will be apparent that a considerable number of minor mechanical changes may be made in the construction described without departure from the spirit of my invention, since the invention is not limited to the precise structural features shown and described.

I claim:

1. In a device of the character described, the combination of a stationary cutter member having one or more cutting edges and an aperture therethrough adjacent to each of said cutting edges, a movable cutter with cutting edges coöperating with those of the stationary member, and an adjustable stationary valve plate directly below said stationary cutter member and adapted to control the passage or passages therethrough, substantially as described.

2. In a device of the character described, the combination of an apertured stationary cutter, a coöperating rotary cutter, a stationary bur, a coöperating rotary bur, and an adjustable stationary valve plate between said cutters and burs disposed directly below said stationary cutter and coöperating with the aperture or apertures of said stationary cutter to control the feed of the cut product to the grinding burs, substantially as described.

3. In a device of the character described, the combination of a cutter member having one or more cutting edges, an aperture through said member at the front of each of said cutting edges, and a downwardly-inclined top surface leading to each of said apertures, and a coöperating cutter having edges coacting with those of the cutter member, substantially as described.

4. In a device of the character described, the combination of a horizontal stationary cutter member having one or more cutting edges, an aperture through said member at the front of each of said cutting edges and a downwardly-inclined top surface leading to each of said apertures, a coöperating horizontal rotary cutter having edges co-acting with those of the cutter member, a stationary bur, a coöperating rotary bur, and a horizontal adjustable valve-plate between said cutters and burs and coöperating with the aperture or apertures of said stationary cutter member to control the feed of the cut product to the grinding burs, substantially as described.

As evidence that I claim the foregoing as my invention, I have signed the same this 7th day of October, A. D., 1907, in the presence of two witnesses.

HARRY GEORGE McCULLOCH.

Witnesses:
   RAY. S. COOMLIUS,
   CLARENCE B. MOLTER.